Figure 1:
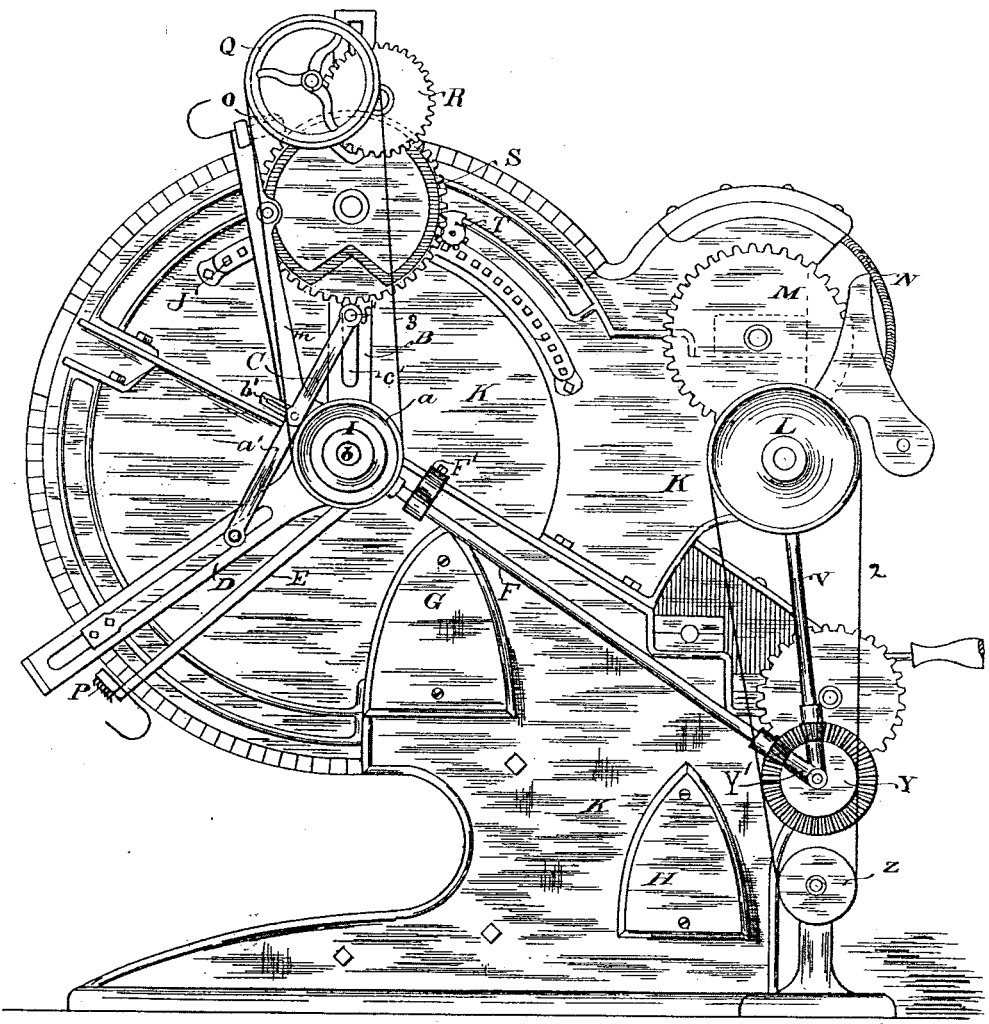

(No Model.) 7 Sheets—Sheet 1.

E. W. THOMAS.
MECHANISM FOR STRIPPING THE FLAT CARDS OF CARDING MACHINES.

No. 340,167. Patented Apr. 20, 1886.

WITNESSES:
Wm. H. Anderson
Charles H. Fisher

INVENTOR.
E. W. Thomas (No Model.) 7 Sheets—Sheet 2.
E. W. THOMAS.
MECHANISM FOR STRIPPING THE FLAT CARDS OF CARDING MACHINES.
No. 340,167. Patented Apr. 20, 1886.

WITNESSES:
Wm. H. Anderson
Charles H. Fisher

INVENTOR:
E. W. Thomas.

(No Model.)  7 Sheets—Sheet 3.

E. W. THOMAS.
MECHANISM FOR STRIPPING THE FLAT CARDS OF CARDING MACHINES

No. 340,167.  Patented Apr. 20, 1886.

WITNESSES:
Wm. H. Anderson
Charles H. Fisher

INVENTOR:
E. W. Thomas.

(No Model.) 7 Sheets—Sheet 4.
E. W. THOMAS.
MECHANISM FOR STRIPPING THE FLAT CARDS OF CARDING MACHINES.

No. 340,167. Patented Apr. 20, 1886.

WITNESSES: Wm. H. Anderson, Charles H. Fisher.

INVENTOR: E. W. Thomas.

(No Model.) 7 Sheets—Sheet 5.
E. W. THOMAS.
MECHANISM FOR STRIPPING THE FLAT CARDS OF CARDING MACHINES.

No. 340,167. Patented Apr. 20, 1886.

WITNESSES.
INVENTOR.

(No Model.) 7 Sheets—Sheet 6.

E. W. THOMAS.
MECHANISM FOR STRIPPING THE FLAT CARDS OF CARDING MACHINES.

No. 340,167. Patented Apr. 20, 1886.

WITNESSES: Wm. H. Anderson, Charles H. Fisher.

INVENTOR: E. W. Thomas.

N. PETERS. Photo-Lithographer, Washington, D. C.

(No Model.)  7 Sheets—Sheet 7.
E. W. THOMAS.
MECHANISM FOR STRIPPING THE FLAT CARDS OF CARDING MACHINES.
No. 340,167. Patented Apr. 20, 1886.

WITNESSES.
Fred A. Lovejoy.
Charles H. Fisher.

INVENTOR.
Edward W. Thomas.
By his Attorney
Channing Whitaker.

United States Patent Office.

EDWARD W. THOMAS, OF LOWELL, MASSACHUSETTS, ASSIGNOR TO THE LOWELL MACHINE SHOP, OF SAME PLACE.

MECHANISM FOR STRIPPING THE FLAT CARDS OF CARDING-MACHINES.

SPECIFICATION forming part of Letters Patent No. 340,167, dated April 20, 1886.

Application filed September 24, 1885. Serial No. 178,024. (No model.)

*To all whom it may concern:*

Be it known that I, EDWARD W. THOMAS, a citizen of the United States, residing at Lowell, in the county of Middlesex and State of Massachusetts, have invented a new and useful Improvement in Mechanism for Stripping the Flat Cards of Carding-Machines, of which the following is a specification.

This invention relates to that class of card-strippers where the mechanism which strips the flat cards is driven at a fast speed while a flat is being taken from its place, stripped, and replaced, and at a slow speed while the stripping mechanism is passing from one flat to another. This class of card-strippers is commonly used upon carding-engines made for carding cotton.

The object of this invention is to provide an improved means for so quickly cleaning a flat card that there shall no large amount of cotton collect in the space left empty by the flat during the operation, and whereby the flats may be cleaned at properly long intervals of time. I am aware that this has hitherto been accomplished in a more or less satisfactory way, and my invention furnishes a means, as hereinafter set forth, for accomplishing that object in a simpler and more effectual way than has hitherto been the case, and in a way well suited to be applied to existing cards.

My invention is an improvement upon the well-known Wellman card-stripper, which is described in Letters Patent No. 14,481, dated March 18, 1856, and is well adapted to be applied to cards of the type known as the "Foss and Pevey under-flat cotton-card," which is set forth in Letters Patent No. 166,089, dated July 27, 1875.

My invention is embodied in the mechanism illustrated in the accompanying drawings of a Foss and Pevey card furnished with the improved flat-card stripper, in which—

Figure 2:
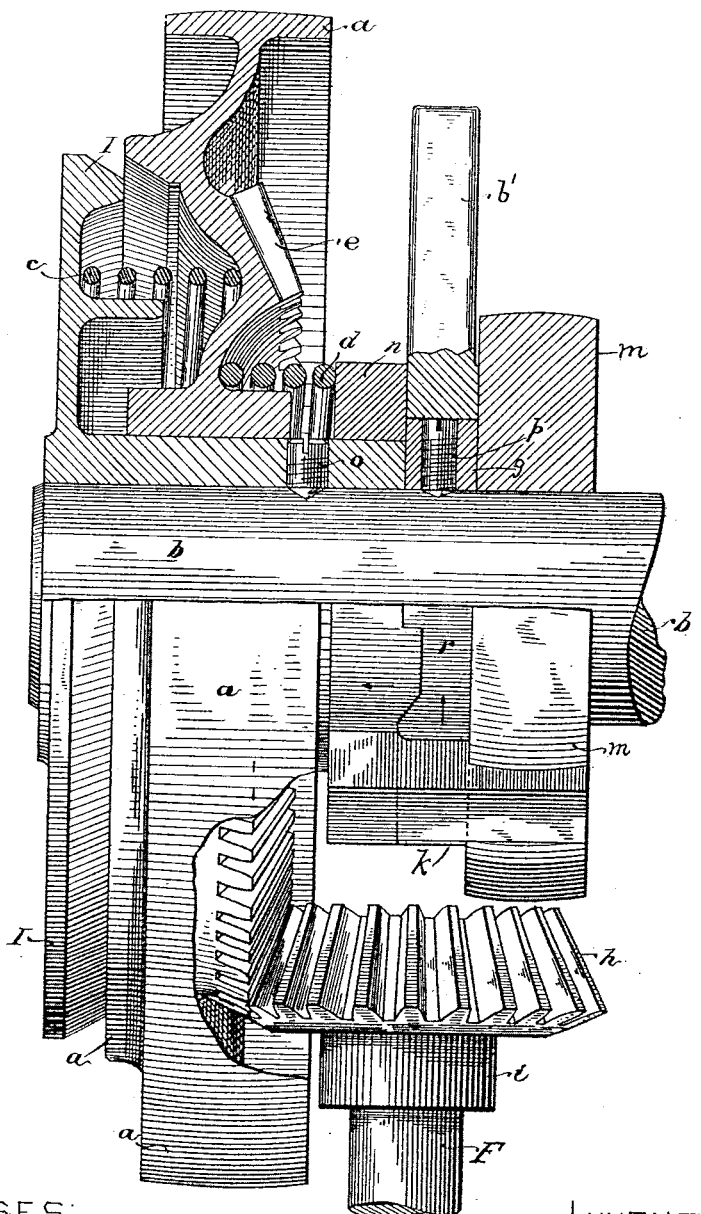
Figure 3:
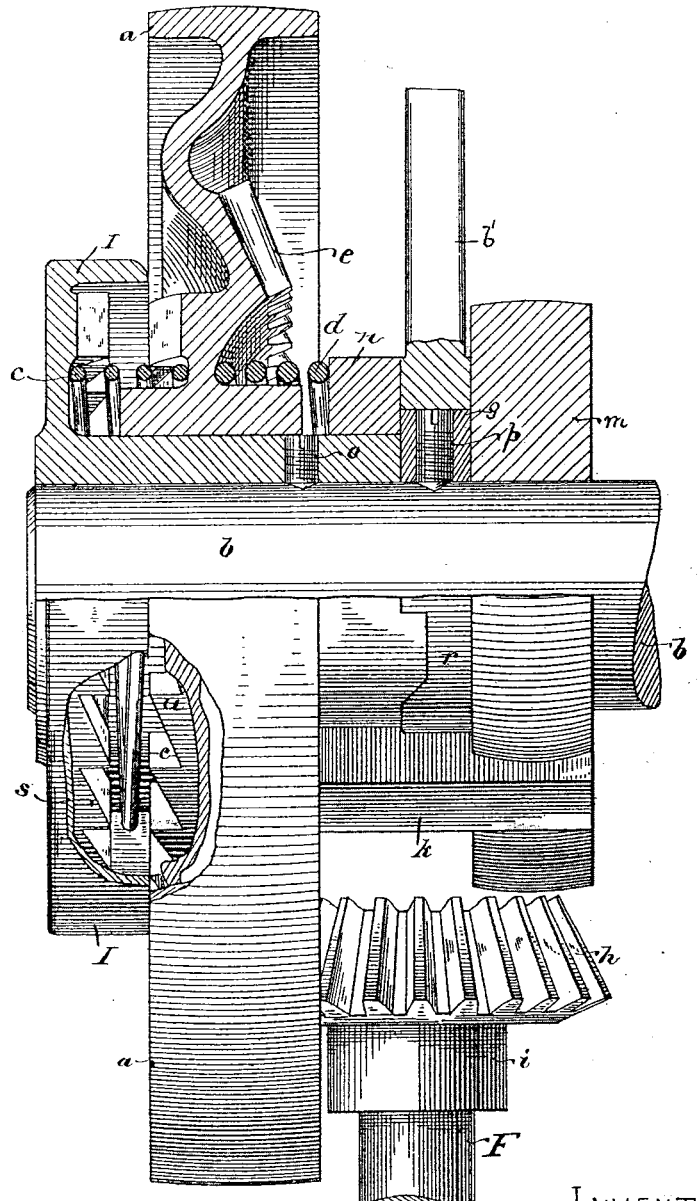
Figures 4, 5:
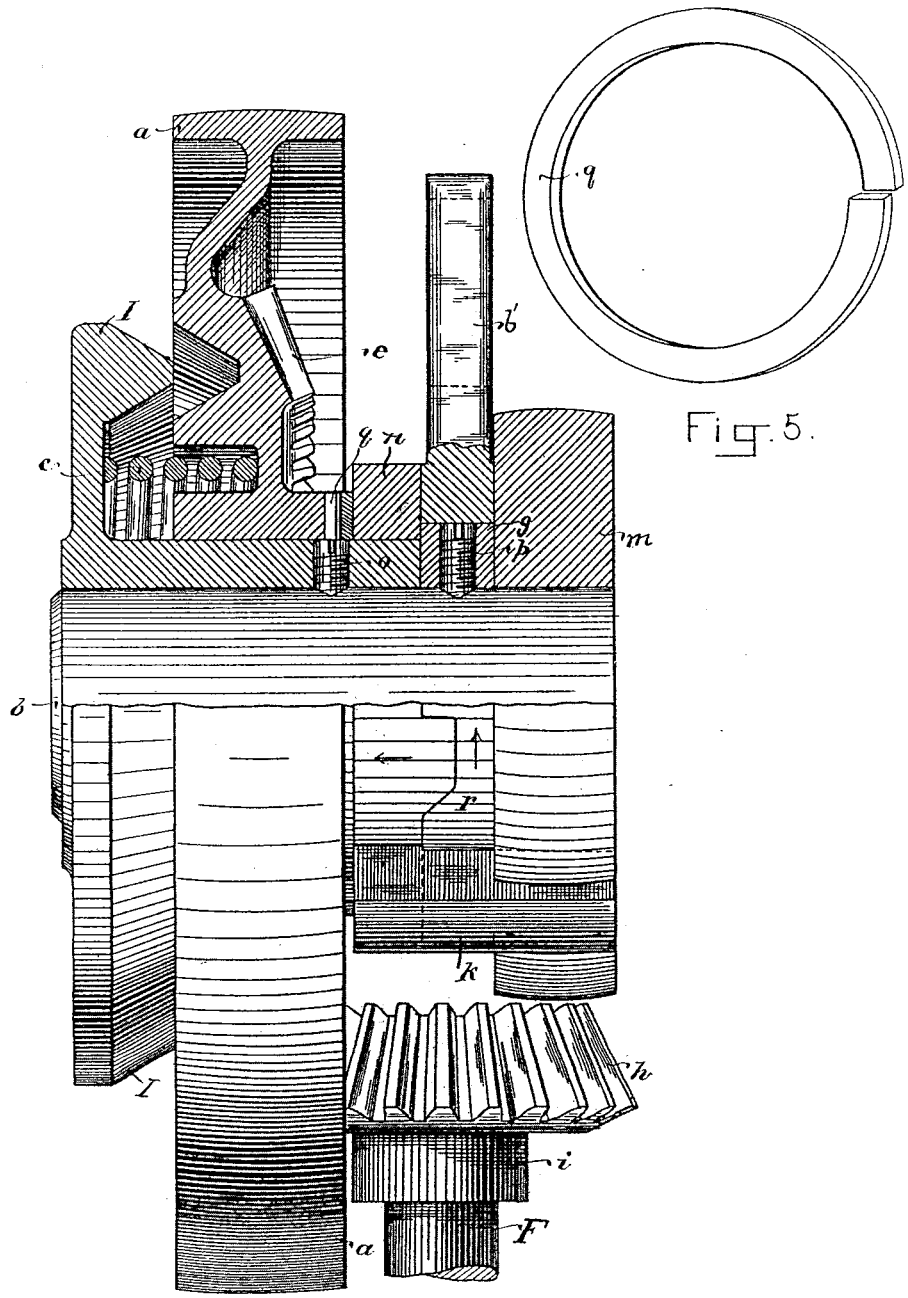
Figures 6, 7:
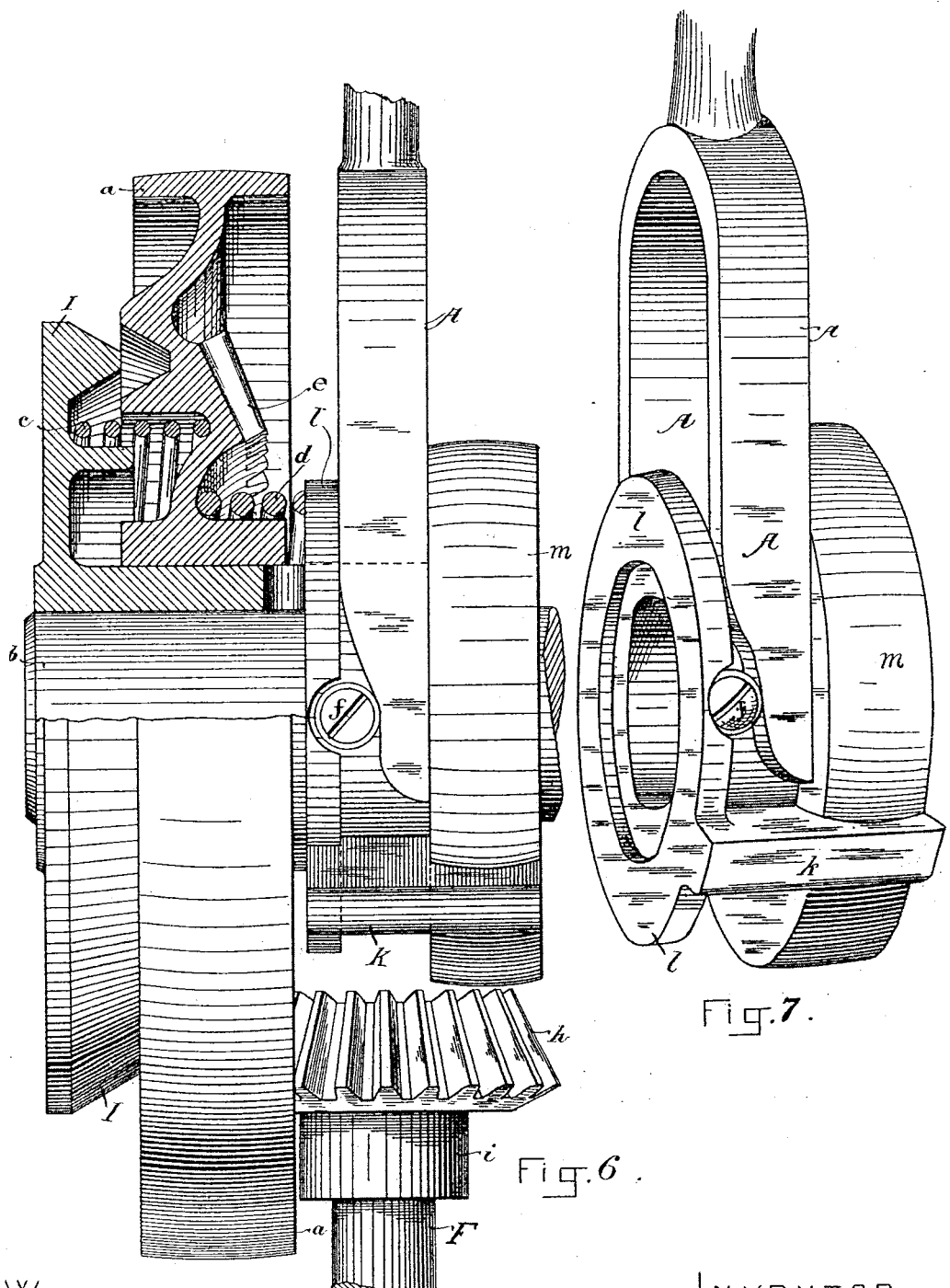
Figure 8:
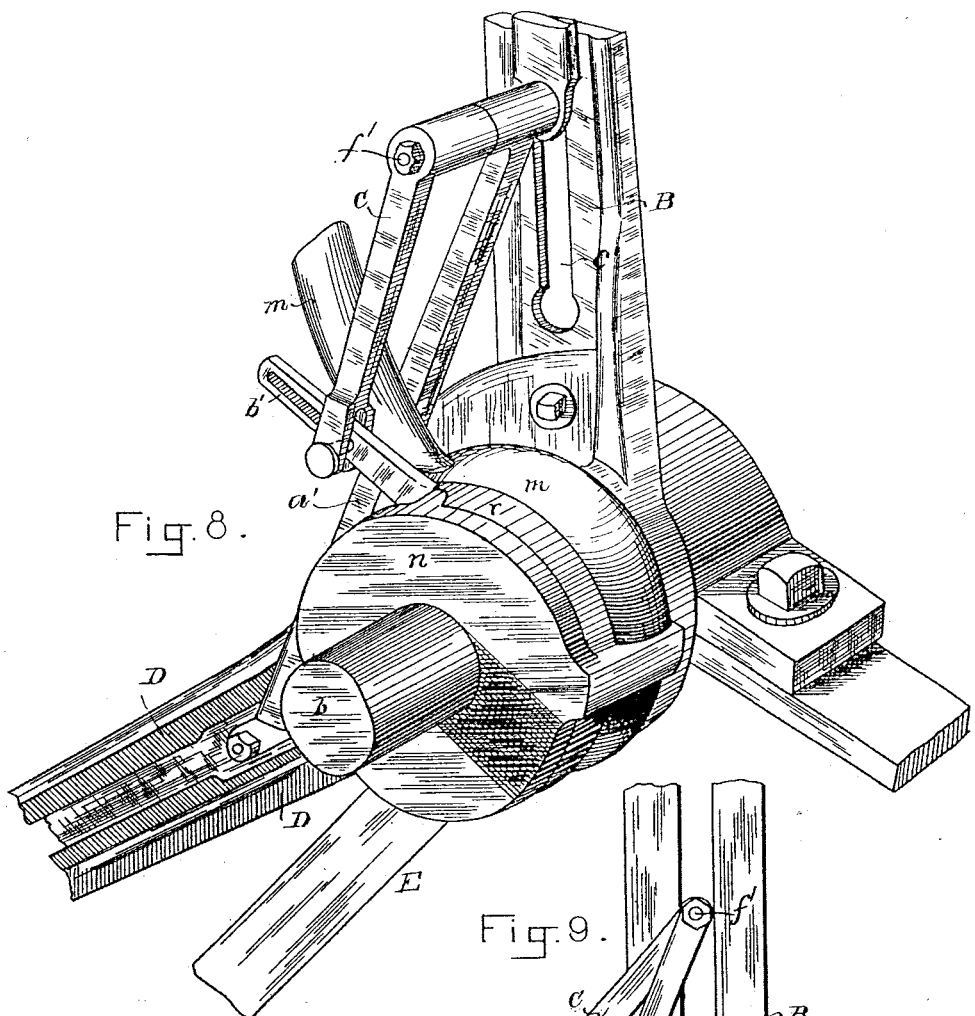
Figure 9:
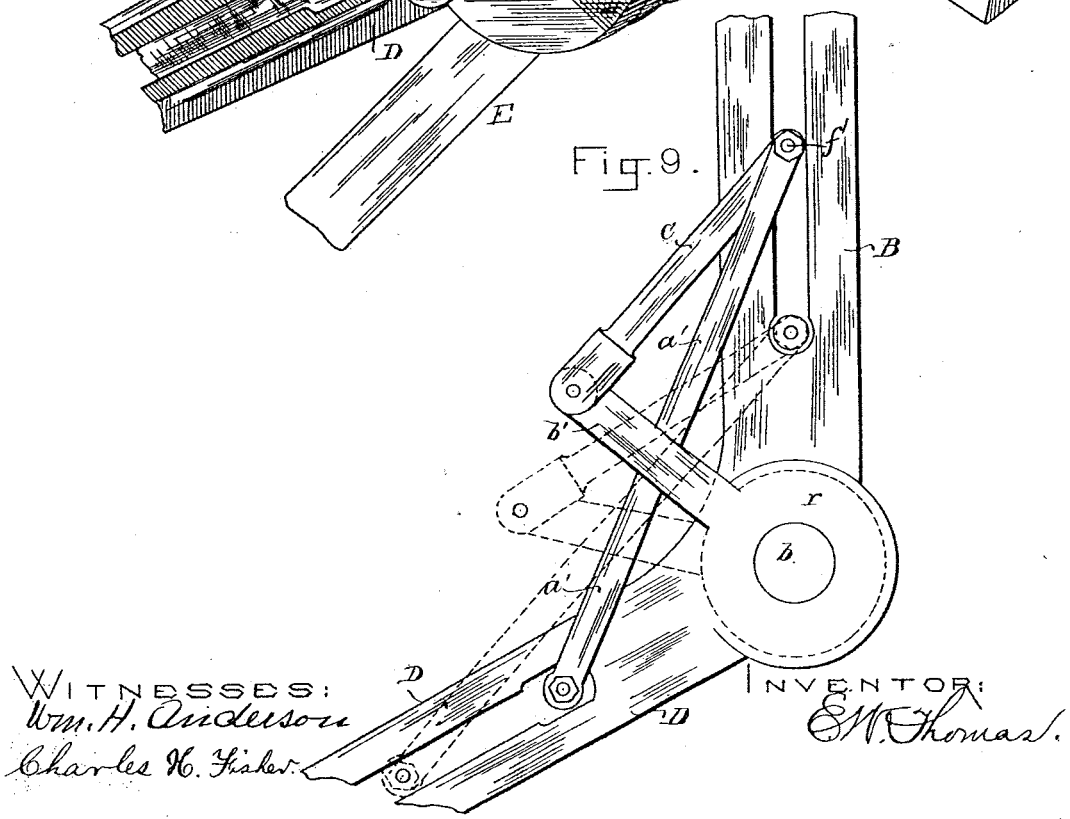
Figure 10:
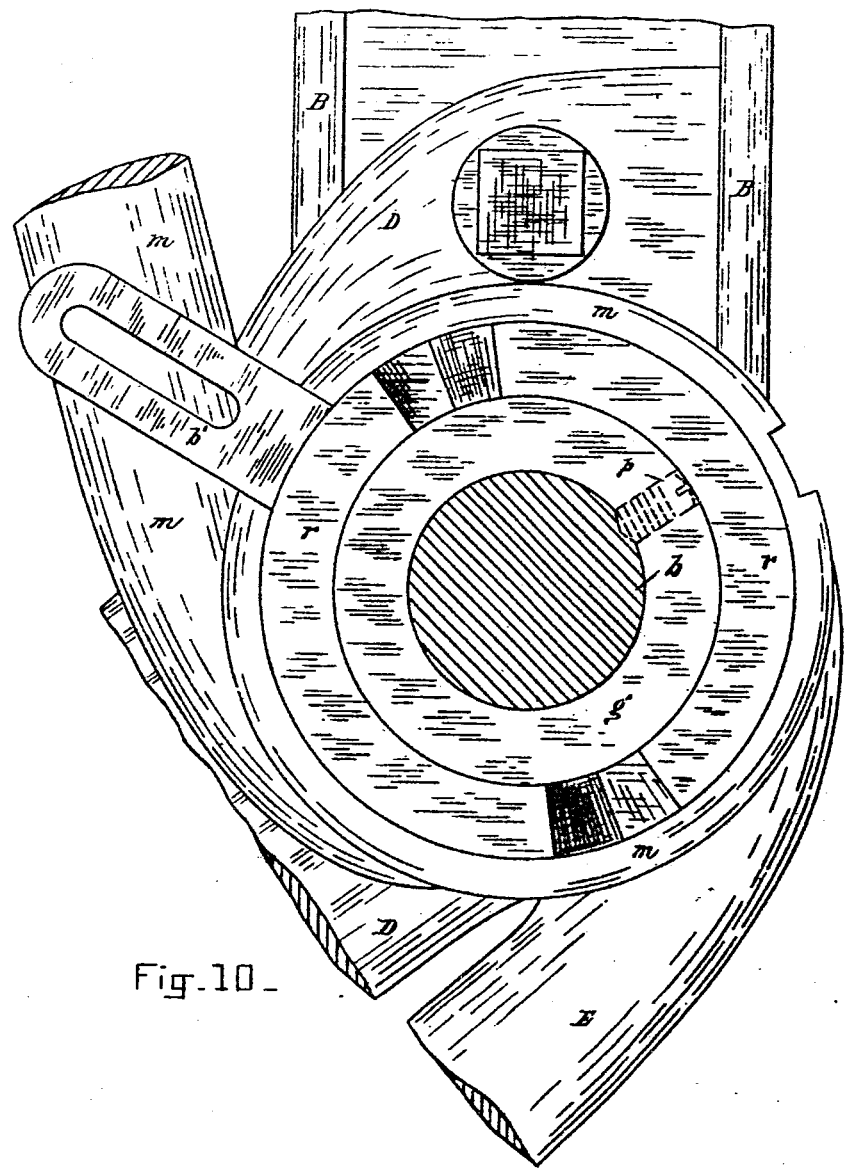

Figure 1 is a side elevation of the card, showing the improved mechanism and its relation to the other parts of the carding-engine. Fig. 2 is an elevation, partly in section, of the form in which I prefer to make those portions of my invention which are fastened to the main cylinder of the carding-engine. Fig. 3 is an elevation, partly in section, of a modified form of the mechanism that is shown in Fig. 2. Fig. 4 is an elevation, partly in section, of a second modified form of the mechanism that is shown in Fig. 2. Fig. 5 is a perspective view of a spring that is used in that form of mechanism that is shown in Fig. 4. Fig. 6 is an elevation, partly in section, of a third modified form of the mechanism that is shown in Fig. 2. Fig. 7 is a perspective view of certain of the important parts which are shown in Fig. 6. Fig. 8 is a perspective view of the axle of the main cylinder of the card, showing the box in which it runs and some of the pieces of the ordinary stripping mechanism, as well as some of the parts of the preferred form of my invention. Fig. 9 is an elevation of some of those parts shown in Fig. 8, and is drawn to show the extreme positions occupied in their motion by the pieces $a'$, $b'$, and C. Fig. 10 is a section of the shaft $b$, made by the plane dividing the collar $g$ from the sleeve of the disk I, and an elevation looking toward the main cylinder of the card, of the cam $r$, collar $g$, and some adjacent parts. This view is drawn to show the position of the said shaft, collar, and cam with respect to each other.

Similar letters of reference refer to similar parts throughout the several views.

The cards of the kind to which my invention may be suitably applied are usually set up in the mills in sections of several cards, the product from all the cards in a section passing off together to a railway-head.

It is the custom to drive the main cylinders of the different cards in a section, each by its own belt, from a driving-shaft of the mill, and also to drive the doffers, which take the cotton from the main cylinders, from a different shaft, which is driven from the railway-head. The feed-rolls, which feed the cotton into the card, are usually driven by a train of mechanism from the doffer. It will be seen, consequently, that if the railway-head is stopped for any reason, all of the cards in the section attached to it will at once stop taking in and delivering cotton. It follows, therefore, that there is no necessity for cleaning the flat cards of the engine at times when the doffer and feed-rolls are stopped.

Fig. 1 is a side elevation of a Foss and Pevey card, and Z is the pulley upon a shaft that is driven from the railway-head, and which drives the doffer N and the feed-rolls of the card by means of the belt 2.

The connecting mechanism between the pulley Z and the feed-rolls is well known to cotton-carders, and need not be here more particularly described, except to say that the bevel gear-wheel Y is in that part of this train which is between the doffer N and the feed-rolls. The wheel Y revolves at a slow rate of speed, and is driven by a bevel-pinion upon the shaft V. The lower end of the shaft V has usually been supported by a single step that has in turn been supported by the stud that supports the wheel Y.

In order to slowly drive a revolving piece which is upon the shaft $b$ of the card, I replace the said single step by the bifurcated step Y', and in one arm of this new step I support the lower end of the shaft F, driving the said shaft by means of the bevel-pinion thereon, which engages with the wheel Y. The other end of the shaft F is supported by the box F', that is fastened to the frame-work of the card.

Upon that end of the shaft F which is near the box F', I attach the bevel-pinion $i h$, as is shown in full detail in Fig. 2, and intermittently drive therefrom the pulley $a$ by means of the bevel-wheel $e$, which is fixed thereto. By means of the belt 3 the pulley $a$ drives the pulley Q, and through it a stripping mechanism of the ordinary construction, the motion from the pulley Q passing through the spur-wheel R to the cam-wheel S, and the pinion T T works upon the pin-rack J and carries the whole stripping mechanism forward and backward over the flat cards of the carding-engine in a way well known to carders of cotton.

K represents the casing, which protects the mechanism of the carding-engine, and G and H are removable doors giving access to certain of its interior portions.

B is the main stripper-arm, and it is supported in its place by the axle $b$, to which the main cylinder of the card is rigidly secured.

In the slot $e'$ of the arm B there slides the main stripper slide, which carries the stud $f'$, as is clearly shown in Fig. 8. Upon the stud $f'$ is placed the stripper-connection $a'$, that connects the main stripper-slide to the under stripper-slide, which works in a slot in the under stripper-arm, D, and which at the proper times forces an under-flat card away from the main cylinder in order that it may be cleaned.

O is the main stripper, which is carried by the main stripper-lever $m$, and P is the under stripper, and is carried by the under stripper-lever, E. The levers E and $m$ are fastened together and supported upon the main cylinder-axle $b$.

C is a connecting-rod, and connects the stud $f'$ with the arm $b'$. The arm $b'$ is sometimes slotted to allow the connecting-rod to be adjusted with reference to it, and it is so shown in Figs. 1 and 8. The arm $b'$ is fixed to the annular cam $r$, and serves to partially rotate it upon the axle $b$. The cam $r$ is shown upon a larger scale in Figs. 2, 3, and 4.

I is a disk, which is rigidly fastened to the axle $b$ of the main cylinder of the card, and which consequently will revolve rapidly when the carding-engine is in operation. I prefer to fasten this disk I to the axle $b$ by means of a sleeve and the set-screw $o$, which passes through it. The disk I carries one-half of a clutch, which intermittently engages with its mate, that is carried by the pulley $a$. This clutch may be either a friction-clutch, as is shown in Figs. 2, 4, and 6, where a conical plug upon the disk I engages with a conical cup upon the pulley $a$, or it may be a toothed clutch, as is shown in Fig. 3, where the ratchet-teeth $s$ upon the disk I engage with the ratchet-teeth $u$ upon the pulley $a$.

Loosely revolving upon the sleeve of the piece I is the pulley $a$, which drives the stripping mechanism. This pulley $a$ may be moved longitudinally for a short distance upon the sleeve on which it turns, and it is provided with a bevel-gear, $e$, or its equivalent, upon one side, and with a means of engaging with the disk I upon the other. This means of engaging $a$ with I may be made so that they will be engaged frictionally, as is shown in Figs. 2, 4, and 6, or so that they will be engaged positively, as is shown in Fig. 3, both methods being clearly shown in the drawings.

Between the disk I and the pulley $a$ is interposed a spiral spring, $c$. This spring is retained in place by a cylindrical projection, which may be upon the pulley $a$, as is shown in Figs. 4 and 3, or upon the disk I, as is shown in Figs. 2 and 6. This spring is for the purpose of moving the pulley $a$ longitudinally along the shaft $b$ and out of connection with the disk I whenever it is allowed to do so by the cam $r$. The spring $c$ may sometimes be replaced by any convenient and equivalent means of forcing the said pulley away from the disk I; but I prefer to use in this place a coiled-wire spring, as shown in the drawings. The main stripper-arm B and the main stripper-lever $m$ are placed upon the shaft $b$, which revolves within them easily. They are retained in place by the annular collar $g$, which, by means of the set-screw $p$, holds them closely to the main box, in which the shaft $b$ turns.

In Fig. 6 the sleeve which connects the piece I to the shaft $b$ is made so long that the collar $g$ may be dispensed with, the sleeve itself retaining the main stripper-arm and lever in their proper position. The said sleeve is sometimes made so short that the piece $n$ may be supported directly upon the shaft $b$, as is shown in Fig. 8.

The annular cam $r$, to which the arm $b'$ is attached, rotates easily upon the collar $g$, and is furnished with notches in its edge, which engage with corresponding notches in the annular piece n. The annular piece n is furnished with the lug k, which engages with a notch in the main stripper-lever m, and is thereby kept in a fixed angular position with reference to it. In consequence of this method of construction, the piece n will be moved longitudinally upon the sleeve which supports it when the cam r is partially rotated. When a longitudinal movement of the annular piece n takes place, the pulley a is also moved along its support by a spring between n and a, and which is much stiffer than the spring c, which moves it in the opposite direction. This spring may be a spiral-wire spring, as is shown by d in Figs. 2 and 3, or it may be such a spring as is shown in Figs. 4 and 5 by q; or, it may be made in any other suitable manner; but this spring must be so made that it will not spread open so much, when released, as to prevent the proper action of the spring c. Though not always necessary, this spring d is used in order that a sufficiently-close engagement of the pulley a and the piece I may take place without danger of breakage, and also to insure their proper engagement, even after a considerable amount of wear has taken place in the mechanism.

The method of action of my invention may now be easily understood. The shaft F is always turning at a slow speed when the doffer and the feed-rolls of the card are in operation. The bevel-pinion i h, upon the shaft F, will always be slowly turning the bevel-wheel e, and with it the pulley a, when the mechanism is in the position shown in Figs. 2, 3, 4, and 8, and by the full lines in Fig. 9, this being the position of the mechanism when the card-stripping mechanism is passing from one flat to another; but as soon as the stripping mechanism begins to take a flat card from its normal position for the purpose of stripping it, the main stripper-slide begins to move downward in the slot in the main stripper-arm, carrying with it the stud f' and the connecting-rod C. This motion of the rod C puts into action the shifting mechanism, which consists of the cam r, and the annular piece n, by causing the annular cam r to rotate slightly and push the piece n along its supporting-sleeve, carrying before it the pulley a, which is thereby put out of connection with the slowly-turning pinion i h, and into connection with the rapidly-revolving disk I. The pulley a now begins to revolve rapidly, and to drive the Wellman stripper very quickly until the flat card is stripped and very nearly returned to its place, when the stud f' pulls the connecting-rod C and causes the cam r to revolve back to its original position, when the piece n releases the pulley a, which is immediately forced by the spring c out of connection with I, and into connection with the slowly-revolving pinion i h, where it will continue until the next flat card is to be raised, when the whole action is repeated.

For the purpose of moving the pulley a from connection with the pinion i h to connection with the piece I and back again, I sometimes, as an equivalent method, replace the cam r and the connecting-rod C with the cam A, that is shown in Figs. 6 and 7, attaching the latter to the stud f', from which the connecting-rod C has been removed. In that case I also use, to move the pulley a from one of its positions to the other, the sleeve l, that is provided with the lug k, which engages with a notch in the main stripper lever, and with rollers held to the sleeve by the screws f.

I do not limit myself to actuating the cam A or the arm b' by means of a connection to the stud f', since they may be actuated by any other equivalent arrangement connected with the Wellman stripping mechanism.

Instead of driving the pulley a slowly by means of the pinion i h and the wheel e, other equivalent means may be employed. I prefer to support the pulley a upon the shaft b of the main carding-cylinder, as is shown in the drawings, although it may be supported in any other equivalent manner.

In the drawings the pulley a is shown as being loosely supported upon a sleeve which is connected to the disk I. This sleeve serves as a bushing to prevent the shaft from being worn by the pulley a, and it also gives a more convenient way of fastening the disk I to the shaft b than is otherwise available when the shaft b is short, as is usually the case; but, for the purposes of my invention, this sleeve may be omitted without detriment when the dimensions of the other parts are properly chosen, and I consider the method of loosely supporting the pulley a upon this sleeve, which is connected to the piece I, to be equivalent to supporting the pulley a directly upon the shaft b. I show in the drawings that the disk I is driven by the shaft of the main cylinder of the card. This method of driving is adopted as being the most convenient one, although any equivalent method of driving the disk I at a sufficiently quick speed will satisfy the requirements of my invention in this respect.

What I claim as new, and desire to secure by Letters Patent, is—

1. The stripping mechanism combined with the pinion i h and a means of driving the same, the disk I and a means of driving it, the spring c, the pulley a, provided with means of engaging with the pinion i h and the disk I, a means, actuated from the stripping mechanism, of shifting the pulley a longitudinally upon its support, and means for driving the stripping mechanism from the pulley a, substantially as described, and for the purpose specified.

2. The stripping mechanism combined with the pinion i h and means of driving the same, the disk I and means of driving it, the spring c, the pulley a, provided with a means of engaging with the disk I and the pinion i h, the shifting mechanism r and n, means of actuating the said shifting mechanism from the stripping mechanism, and means for driving the stripping mechanism from the pulley $a$, substantially as described, and for the purpose set forth.

3. The stripping mechanism combined with the disk I and a means of driving the same, the pulley $a$, provided with means of engaging with the disk I, a means, actuated from the stripping mechanism, of shifting the pulley $a$ longitudinally upon its support, and means of driving the stripping mechanism from the pulley $a$, substantially as described, and for the purpose specified.

4. The stripping mechanism combined with the disk I and means of driving the same, the pulley $a$, provided with a means of engaging with the disk I, the shifting mechanism $r$ and $n$, means of actuating the said shifting mechanism from the said stripping mechanism, and means of driving the said stripping mechanism from the pulley $a$, substantially as described, and for the purpose set forth.

5. The stripping mechanism combined with the disk I and means of driving the same, the pulley $a$, provided with means of engaging with the disk I, the shifting mechanism $r$ and $n$, means of actuating the said shifting mechanism from the stripping mechanism, the spring $c$, and means of driving the stripping mechanism from the pulley $a$, substantially as described, and for the purpose specified.

EDWARD W. THOMAS.

Witnesses:
WM. H. ANDERSON,
CHARLES H. FISHER.